under 35
U.S.C. 154(b) by 0 days.

(12) United States Patent
Grobis et al.

(10) Patent No.: US 9,087,546 B1
(45) Date of Patent: Jul. 21, 2015

(54) COMBINED MICRO HEATER AND WAVEGUIDE POWER SENSOR FOR HEAT-ASSISTED MAGNETIC RECORDING

(71) Applicant: HGST Netherlands B.V., Amsterdam (NL)

(72) Inventors: Michael K. Grobis, San Jose, CA (US); Lidu Huang, Danville, CA (US); Shen Ren, Union City, CA (US); Hans J. Richter, Palo Alto, CA (US); Erhard Schreck, San Jose, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/271,254

(22) Filed: May 6, 2014

(51) Int. Cl.
*G11B 11/00* (2006.01)
*G11B 11/105* (2006.01)
*G11B 5/02* (2006.01)
*G11B 5/00* (2006.01)

(52) U.S. Cl.
CPC .......... *G11B 11/10536* (2013.01); *G11B 5/02* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,451,696 B2 | 5/2013 | Huang et al. | |
| 8,477,569 B2 | 7/2013 | Erden et al. | |
| 8,503,125 B2 | 8/2013 | Contreras et al. | |
| 8,514,672 B2 | 8/2013 | Grobis et al. | |
| 8,526,274 B2 | 9/2013 | Naniwa et al. | |
| 8,810,947 B1* | 8/2014 | Ren et al. | 360/59 |
| 2006/0067001 A1* | 3/2006 | Hsu et al. | 360/234.3 |
| 2007/0230047 A1* | 10/2007 | Jin et al. | 360/126 |
| 2009/0225464 A1* | 9/2009 | Juang et al. | 360/59 |
| 2009/0262608 A1* | 10/2009 | Kurita et al. | 369/13.33 |
| 2010/0074062 A1* | 3/2010 | Kamijima et al. | 369/13.14 |
| 2010/0165822 A1* | 7/2010 | Balamane et al. | 369/112.27 |
| 2010/0195238 A1* | 8/2010 | Shimazawa et al. | 360/59 |
| 2011/0096431 A1* | 4/2011 | Hellwig et al. | 360/59 |
| 2012/0201108 A1* | 8/2012 | Zheng et al. | 369/13.26 |
| 2013/0170060 A1* | 7/2013 | Johns et al. | 360/31 |
| 2013/0279045 A1 | 10/2013 | Agari et al. | |
| 2014/0029397 A1* | 1/2014 | Rausch et al. | 369/13.24 |
| 2014/0146647 A1* | 5/2014 | Andruet et al. | 369/13.17 |
| 2014/0177406 A1* | 6/2014 | Inoue et al. | 369/13.13 |

* cited by examiner

*Primary Examiner* — Thang Tran
(74) *Attorney, Agent, or Firm* — Zilka-Kotab, PC (57) ABSTRACT

In one general embodiment, an apparatus includes a write pole, a near field transducer, a waveguide for delivering light to the near field transducer, and a first heating device positioned between the write pole and at least one of the waveguide and the near field transducer.

20 Claims, 9 Drawing Sheets

COMBINED MICRO HEATER AND WAVEGUIDE POWER SENSOR FOR HEAT-ASSISTED MAGNETIC RECORDING

FIELD OF THE INVENTION

The present invention relates to data storage systems, and more particularly, this invention relates to heat-assisted magnetic recording (HAMR).

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

However, the further miniaturization of the various components, particularly, the size and/or pitch of magnetic grains, presents its own set of challenges and obstacles in conventional HDD products. Noise performance and spatial resolution are key parameters in magnetic recording media and are ongoing challenges to advance the achievable areal density of media. The dominant media noise source today is transition jitter. In sputtered media, it reflects the finite size, random positioning and dispersions in size, orientation and magnetic properties of the fine grains that comprise the media.

In order to address grain size and transition jitter it was proposed to change the recording mechanism from conventional magnetic field recording to HAMR, also known as "thermally assisted magnetic recording" TAR or TAMR. HAMR recording employs heat to lower the effective coercivity of a localized region on the magnetic media surface and write data within this heated region. The data state becomes stored, or "fixed," upon cooling the media to ambient temperatures. HAMR techniques can be applied to longitudinal and/or perpendicular recording systems, although the highest density state of the art storage systems are more likely to be perpendicular recording systems. Heating of the media surface has been accomplished by a number of techniques such as focused laser beams or near field optical sources.

However, these techniques for heating the media surface during HAMR recording also cause the temperature of the HAMR heads themselves to increase, thereby inducing thermal expansion. As a result, the HAMR heads expand towards the media. Yet, as the distance between the media and a media facing side of the HAMR head fluctuates with heating and cooling thereof, so does the field strength applied to the medium when writing during expansion, and consequently the signal strength observed during readback. Conventional products are thereby afflicted by inconsistent read and write reliability.

In sharp contrast, various embodiments herein implement a heating device that is preferably able to achieve an about constant spacing between a media facing side of a head and a medium during reading and/or writing thereto, as will be described in further detail below.

SUMMARY

An apparatus according to one embodiment includes a write pole, a near field transducer, a waveguide for delivering light to the near field transducer, and a first heating device positioned between the write pole and at least one of the waveguide and the near field transducer.

A method for pre-protruding a write pole according to another embodiment includes activating a first heating device to pre-heat a write pole, activating a light source to illuminate a near field transducer via a waveguide during a writing operation, and at least partially deactivating the first heating device during at least a portion of the writing operation.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Moreover, it should be noted that, as used herein, the term "about" with reference to some stated value refers to the stated value ±10% of said value.

The following description discloses several preferred embodiments of disk-based storage systems and/or related systems and methods, as well as operation and/or component parts thereof.

In one general embodiment, an apparatus includes a write pole, a near field transducer, a waveguide for delivering light to the near field transducer, and a first heating device positioned between the write pole and at least one of the waveguide and the near field transducer.

In one general embodiment, a method for pre-protruding a write pole includes activating a first heating device to pre-heat a write pole, activating a light source to illuminate a near field transducer via a waveguide during a writing operation, and at least partially deactivating the first heating device during at least a portion of the writing operation.

Figure 1:
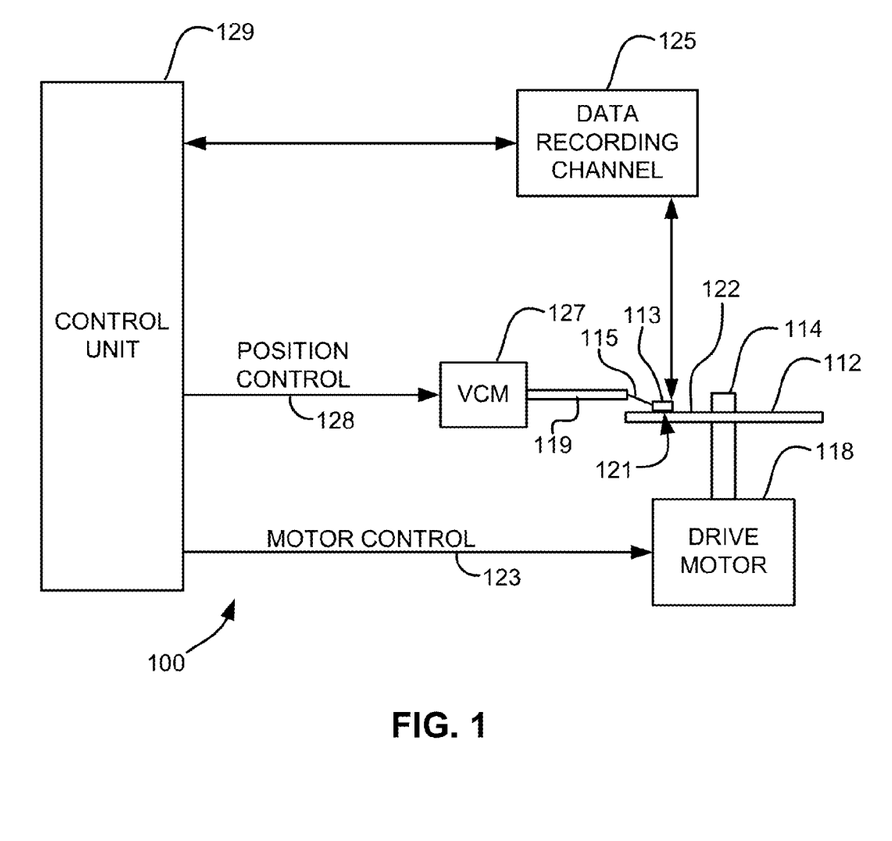
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers of the write portion by a gap layer at or near a media facing side of the head (sometimes referred to as an ABS in a disk drive). The pole piece layers may be connected at a back gap. Currents are conducted through the coil layer, which produce magnetic fields in the pole pieces. The magnetic fields fringe across the gap at the media facing side for the purpose of writing bits of magnetic field information in tracks on moving media, such as in circular tracks on a rotating magnetic disk.

The second pole piece layer has a pole tip portion which extends from the media facing side to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
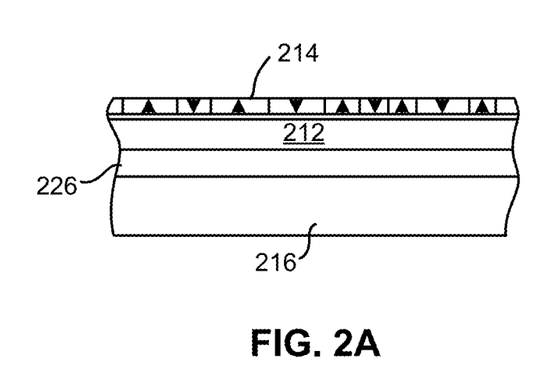
FIG. 2A is a magnetic recording medium utilizing a perpendicular HAMR recording format.

FIG. 2A illustrates a schematic diagram of a HAMR recording medium usable with magnetic disc recording systems, such as that shown in FIG. 1, according to one embodiment. This medium is utilized for recording magnetic impulses substantially perpendicular to the surface of a recording medium. For such perpendicular recording, the medium typically includes an underlayer 212 of a material having a high magnetic permeability. This underlayer 212 is then provided with an overlying coating 214 of HAMR-type magnetic material preferably having a high coercivity relative to the under layer 212.

As discussed above, heat assisted magnetic recording (HAMR) employs heat to lower the effective coercivity of a localized region on the magnetic media surface and to write data within this heated region. For instance, HAMR involves directing electromagnetic radiation (e.g. visible, infrared, ultraviolet light, etc.) onto a surface of a magnetic medium to raise the temperature of a localized area of the medium to facilitate switching of the magnetization of the area. The achievable recording density is related to the size of this heated region on the magnetic medium. After the writing phase, it is important that the heated region of the medium cools quickly to prevent thermal fluctuations from disturbing the written data.

Given that media magnetic anisotropy is a function of temperature, HAMR recording media thus requires a well-controlled thermal profile in order to achieve high track density. It is particularly desirable for HAMR media to have a high thermal gradient. In other words, it is desirable for the temperature of the HAMR media to have a large gradient (e.g. a change per unit distance) in both a lateral direction (e.g. in the plane of the media) and a vertical direction (perpendicular to the plane of the media). Accordingly, in some approaches, HAMR media may comprise a heat sink layer to conduct or direct heat away from the recording layer after writing in order to limit thermal erasure. See, e.g., the heat sink layer 226 of FIG. 2A. However, conventional heat sink layers may conduct heat both vertically and laterally. Employing such conventional heat sink layers may therefore result in the HAMR media exhibiting lateral thermal spreading during the writing process, may limit track density and the size of the data bits.

Figure 2B:
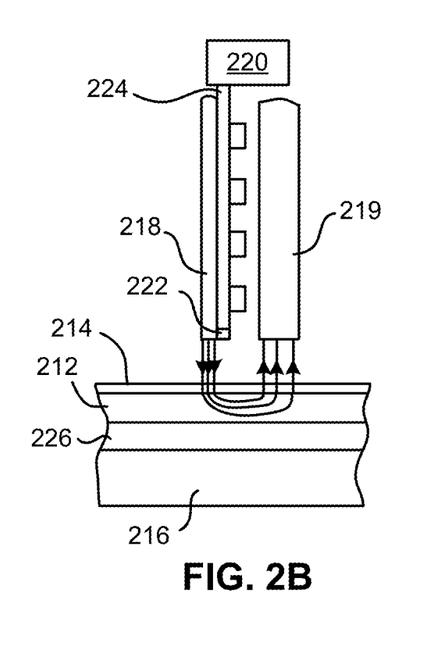
FIG. 2B is a schematic representation of a HAMR recording head and recording medium combination for perpendicular HAMR recording on one side.

Referring now to FIG. 2B, the operative relationship between a HAMR head 218 and a recording medium is shown according to one embodiment. The recording medium illustrated in FIG. 2B includes the high permeability underlayer 212, the overlying coating 214 of magnetic material, and the heat sink layer 226, described with respect to FIG. 2A above. However, these layers 212, 214, and 226 are shown applied to a suitable substrate 216. Typically there is also an additional layer (not shown) called an "exchange-break" layer or "interlayer" between layers 212 and 214.

A heating mechanism of any known type heats layer 214 to lower the effective coercivity of a localized region on the magnetic media surface in the vicinity of the write pole 218 of the head. In the structure shown, a light source 220 such as a laser illuminates a near field transducer (NFT) 222 of known type via a waveguide 224 of conventional construction. See FIG. 4A for a description of an illustrative heating mechanism. Referring again to FIG. 2B, the magnetic lines of flux extending between the write pole 218 and return pole 219 of the head loop into and out of the overlying coating 214 of the recording medium with the high permeability underlayer 212 of the recording medium causing the lines of flux to pass through the overlying coating 214 in a direction generally perpendicular to the surface of the medium to record information in the overlying coating 214 of magnetic material preferably having a high coercivity relative to the underlayer 212 in the form of magnetic impulses having their axes of magnetization substantially perpendicular to the surface of the medium. The flux is channeled by the soft underlying coating 212 back to the return pole 219 of the head.

In some approaches, a HAMR recording medium, such as those disclosed herein, may not have a soft underlayer present in the media stack, in which case, the flux lines will be confined within the media layer 214 and run parallel to the surface of the media.

Figure 3A:
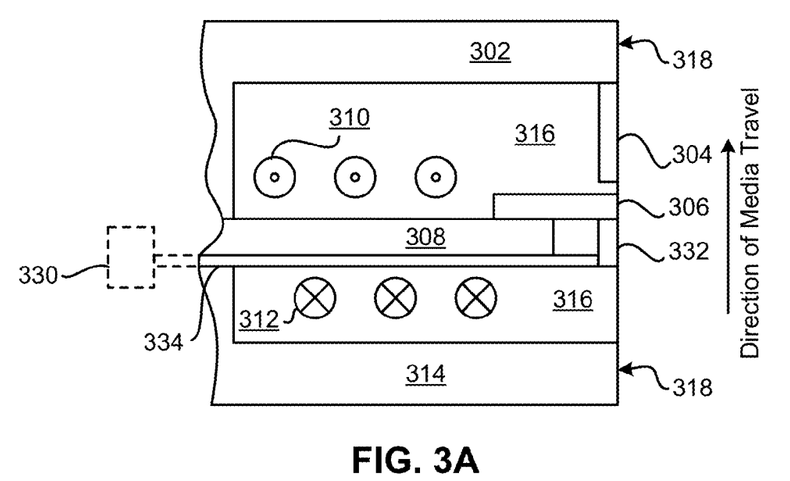
FIG. 3A is a cross-sectional view of one particular embodiment of a perpendicular magnetic head with helical coils.

Referring now to FIG. 3A, a cross-sectional view of a perpendicular magnetic head is shown according to one embodiment. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

A heating mechanism of any known type is provided to heat the medium for HAMR. In the structure shown, a light source 330 such as a laser illuminates a NFT 332 of known type via a waveguide 334.

Perpendicular writing is achieved by forcing flux through the stitch pole 308 into the main pole 306 and then to the surface of the disk positioned towards the ABS 318.

Figure 3B:
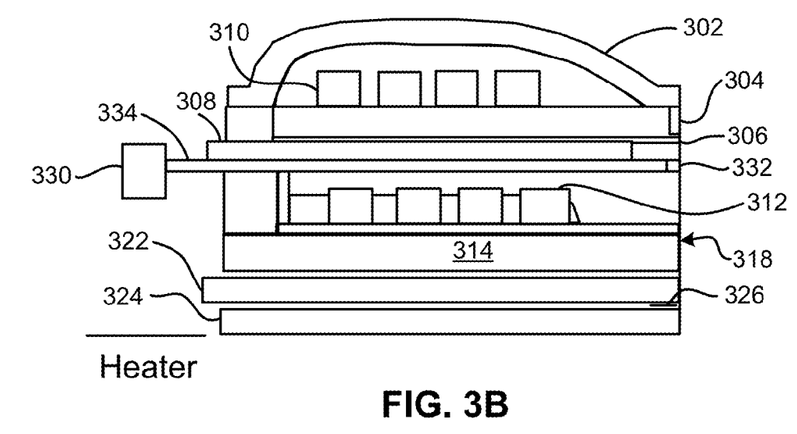
FIG. 3B is a cross-sectional view of one particular embodiment of a piggyback magnetic head with helical coils.

FIG. 3B illustrates a piggyback magnetic head having similar features to the head of FIG. 3A, including the heating mechanism. Two shields 304, 314 flank the stitch pole 308 and main pole 306. Also sensor shields 322, 324 are shown. The sensor 326 is typically positioned between the sensor shields 322, 324.

In FIG. 3B, an optional heater is shown near the non-ABS side of the magnetic head. A heater (Heater) may also be included in the magnetic heads shown in FIG. 3A. The position of this heater may vary based on design parameters such as where the protrusion is desired, coefficients of thermal expansion of the surrounding layers, etc.

Figure 4A:
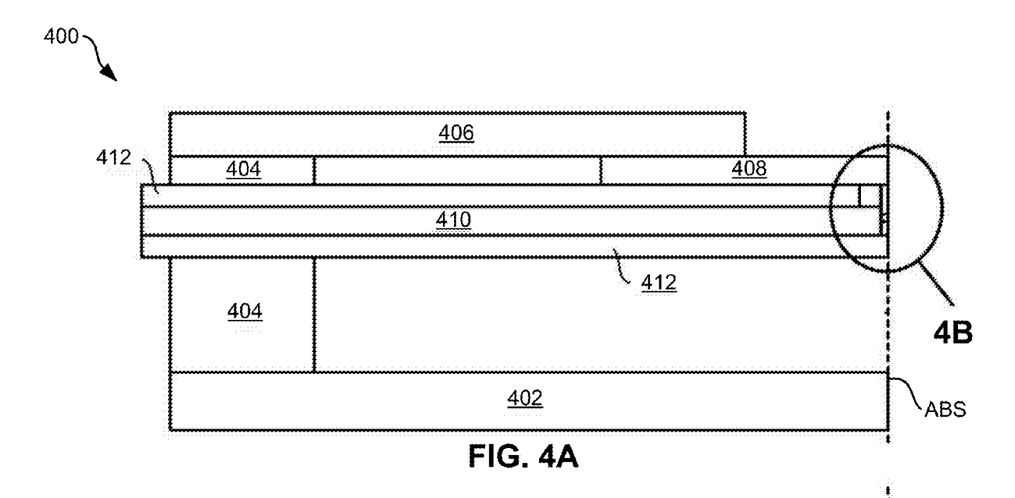
FIG. 4A is a partial cross section view of a thin film perpendicular write head design according to one embodiment.

Referring now to FIG. 4A, a partial cross section view of a system 400 having a thin film perpendicular write head design incorporating an integrated aperture near field optical source (e.g., for HAMR operation) is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 4A, the write head has a lower return pole layer 402, back-gap layer(s) 404, upper return pole layer 406, and upper pole tip layer 408. In one approach, the lower return pole layer 402 may also have a lower pole tip (not shown) at the ABS. Layer 410 is an optical waveguide core, which may be used while conducting HAMR, e.g., to guide light from a light source to heat a medium (not shown) at the ABS when the system 400 is writing thereto. According to a preferred approach, the optical waveguide core is surrounded by cladding layers 412. Moreover, layers 410 and 412 may extend through at least a portion of back-gap layer(s) 404. The components inside of Circle 4B are shown in an expanded view in FIG. 4B, as discussed in further detail below.

Layer 410 may be comprised of a suitable light transmitting material, as would be known by one of reasonable skill in the relevant art. Exemplary materials include $Ta_2O_5$, and/or $TiO_2$. As shown, the core layer 410 has approximately uniform cross section along its length. As well known in the art, the optical waveguide can have a number of other possible designs including a planar solid immersion mirror or planar solid immersion lens which have a non-uniform core cross section along the waveguide's length.

In various approaches, coil layers (not shown) and various insulating and spacer layers (not shown) might reside in the cavity bounded by the ABS, back-gap(s) 404, lower return pole 402, and/or upper bounding layers 406, 408, and 412 as would be recognized by those of skill in the art. Layers 402, 404, 406, and 408 may be comprised of a suitable magnetic alloy or material, as would be known by one of reasonable skill in the relevant art. Exemplary materials include Co, Fe, Ni, Cr and combinations thereof.

As described above, FIG. 4B is a partial cross section expanded view of detail 4B in FIG. 4A, in accordance with one embodiment. Pole lip 416 is magnetically coupled to upper pole tip layer 408, and to optional magnetic step layer 414. Aperture 418 (also known as a ridge aperture), surrounding metal layer 420, and pole lip 416 comprise the near field aperture optical source (or NFT), which is supplied optical energy via optical waveguide core 410. Pole lip 416 and optional magnetic step layer 414 may be comprised of a suitable magnetic alloy, such as Co, Fe, Ni, Cr and/or combinations thereof. Metal layer 420 may be comprised of Cu, Au, Ag, and/or alloys thereof, etc.

Figure 4B:
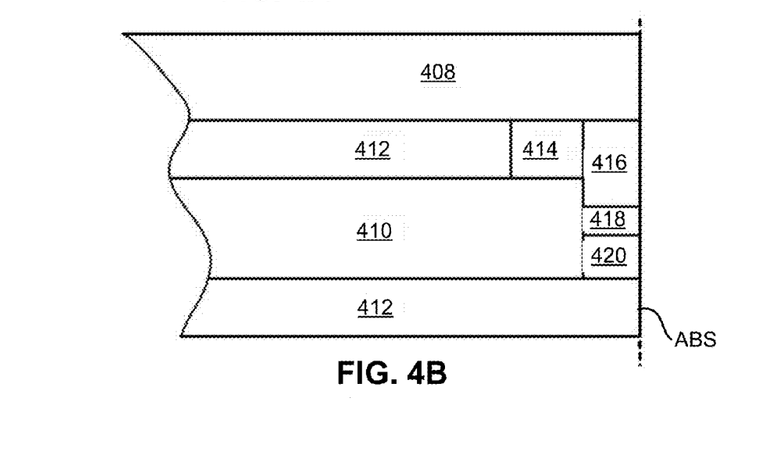
FIG. 4B is a partial cross section expanded view of detail 4B in FIG. 4A, in accordance with one embodiment.

With continued reference to FIG. 4B, cladding layer 412 thickness may be nominally about 300 nm, but may be thicker or thinner depending on the dimensions of other layers in the structure. Optional magnetic step layer 414 may have a nominal thickness (the dimension between layers 408 and 410) of about 300 nm, and a nominal depth (as measured from layer 416 to layer 412) of about 180 nm. Pole lip 416 may have a nominal depth (as measured from the ABS) approximately equal to that of layer 420, with the value being determined by the performance and properties of the near field optical source (see examples below). The thickness of the pole lip 416 can vary from about 150 nm (with the optional magnetic step layer 414) to about 1 micron, preferably between about 250 nm and about 350 nm. The thickness of optical waveguide core layer 410 may be nominally between about 200 nm and about 400 nm, sufficient to cover the thickness of the aperture 418. In the structure shown in FIG. 4B, the layer 408 extends to the ABS. In some preferred embodiments, the layer 408 may be recessed from the ABS while maintaining magnetic coupling with the layers 414 and 416.

Except as otherwise described herein, the various components of the structures of FIGS. 3A-4B may be of conventional materials and design, as would be understood by one skilled in the art.

As mentioned previously, conventional products are afflicted with inconsistent read and write reliability as a result of fluctuating protrusion during read and/or write operations. A large contributing factor to fluctuating protrusion of conventional HAMR heads is the slow protrusion rates associated therewith. For example, thermal fly-height control (TFC) and write current (Iw) may take significantly longer than 100 µs to reach steady state protrusion according to an illustrative embodiment. Even 20 µs to 50 µs to reach steady state protrusion as seen for an NFT is far too slow, as full recording signal strength may be achieved in only 10 µs to 20 µs for some embodiments. Thus, writing may occur while the head is still expanding.

By implementing designs requiring a greater amount of time to reach steady state protrusion than to reach full recording signal strength, the spacing between conventional HAMR heads and the media changes during write operations, thereby creating variations in the quality of the recorded data. As the distance between the media and a media facing side of the conventional HAMR head fluctuates, so does the respective signal strength. Again, this causes inconsistent read and write reliability.

Figure 5:
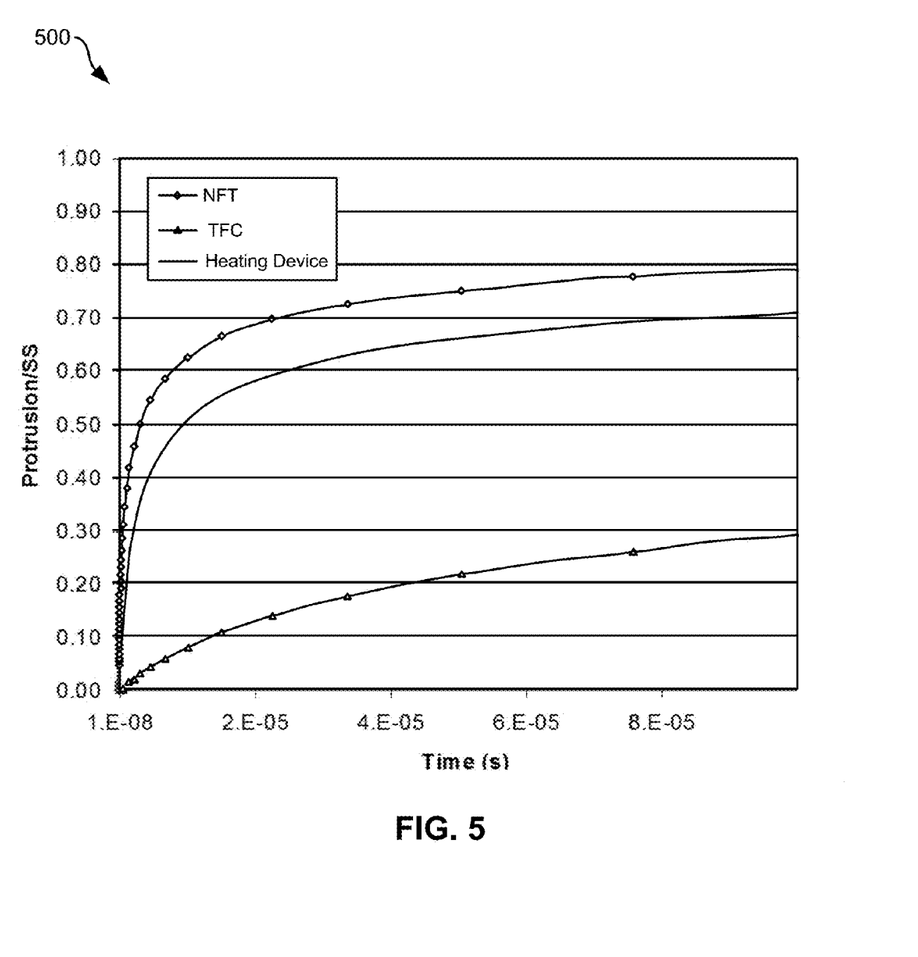
FIG. 5 is a graph illustrating protrusion rates, in accordance with several embodiments.

In sharp contrast, various embodiments herein implement a heating device that is preferably able to achieve an about constant spacing between a media facing side of a head and a medium both prior to and during reading and/or writing thereto. Referring momentarily to FIG. 5, graph 500 illustrates the response time of such a heating device, achieved via modeling according to one example. As shown, the protrusion times of conventional NFTs and TFC heaters alone are too slow to achieve a desired constant spacing between a media facing side of an apparatus and a magnetic medium. However, according to various embodiments described herein, by adding a heating device with a protrusion time approximately an order of magnitude faster than that of a conventional TFC heater, about constant spacing between a media facing side of a head and a medium may become possible, as will soon become apparent. It should also be noted that the spacing between a media facing side of an apparatus at about the main pole thereof, and a magnetic medium is also referred to herein as the "head-media spacing."

Figure 6:
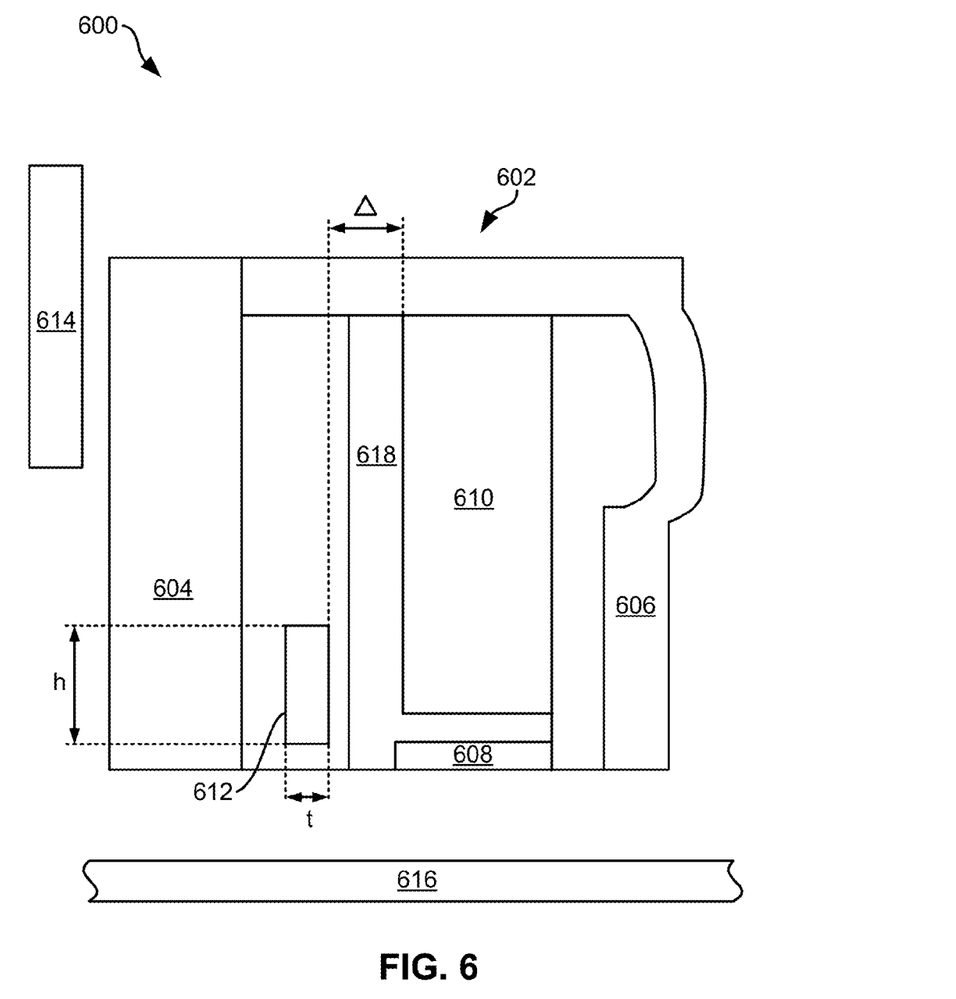
FIG. 6 is a partial cross section view of an apparatus, in accordance with one embodiment.

Looking now to FIG. 6, an apparatus 600 is illustrated in accordance with one embodiment. As an option, the present apparatus 600 may be implemented in conjunction with features from any other embodiment listed herein, such as those described with reference to the other FIGS. Of course, however, such apparatus 600 and others presented herein may be used in various applications and/or in permutations which may or may not be specifically described in the illustrative embodiments listed herein. Further, the apparatus 600 presented herein may be used in any desired environment. Thus FIG. 6 (and the other FIGS.) should be deemed to include any and all possible permutations.

The apparatus 600 includes a write yoke 602 having write poles, including a return pole 604 and a main pole 606. According to various embodiments the return pole 604 and/or main pole 606 may be comprised of a suitable magnetic alloy or material, as would be known by one of reasonable skill in the relevant art. Exemplary materials include Co, Fe, Ni, Cr, etc., and/or combinations thereof. Furthermore, the return pole 604 and/or main pole 606 may include any of the approaches described above, e.g., see FIGS. 2B-4B. Turns of one or more write coils (not shown) may be positioned between the return pole 604 and main pole 606.

The apparatus 600 further includes an NFT 608, a waveguide 610 for delivering light to the NFT 608, and cladding 618. Furthermore, the apparatus 600 may additionally include a controller according to any of the embodiments described and/or suggested herein, e.g., see control unit 129 of FIG. 1. Furthermore, it should be noted that the controller may be configured to perform one or more of the steps presented in method 700 of FIG. 7, as will be described in detail below.

Referring still to FIG. 6, the apparatus 600 also includes a first heating device 612 in addition to a TFC heater 614. The TFC heater 614 may include any conventional heater that would be apparent to one skilled in the art upon reading the present description. In one approach, which is in no way intended to limit the invention, the first heating device 612 and TFC heater 614 may be separately controllable, e.g., they may have individual leads coupled to a controller (e.g., see 129 of FIG. 1).

According to various embodiments described herein, the first heating device 612 is preferably able to affect the protrusion of a media facing side of the apparatus 600 towards a magnetic medium 616. As will be described in further detail below, the first heating device 612 may operate in combination with the waveguide 610, NFT 608 and/or TFC heater 614 to achieve a desired protrusion. It follows that in some approaches, which are in no way intended to limit the invention, the first heating device 612 may be positioned towards a media facing side of the apparatus 600. It should also be noted that magnetic medium 616 may include any of the approaches presented above with reference to magnetic disk 112 of FIG. 1.

In a preferred embodiment, the first heating device 612 is positioned between either of the write poles 604, 606 and at least one of the waveguide 610 and the NFT 608. Looking to the embodiment illustrated in FIG. 6, the first heating device 612 is positioned between the return pole 604 and both the waveguide 610 and NFT 608. However, according to another exemplary embodiment, the first heating device 612 may be positioned between the main pole 606 and one or both of the waveguide 610 and NFT 608. Thus, depending on the direction in which a magnetic medium 616 may be traveling, e.g., during a read and/or write operation, the relative position of the first heating device 612 may be on a leading, or possibly a trailing side of the waveguide 610 and NFT 608.

According to various approaches, the first heating device 612 may include NiFe, Ta, Pt, Au, Rh, etc., and/or alloys thereof. The first heating device 612 may also include other materials having a high temperature coefficient of resistivity as would be appreciated by one skilled in the art upon reading the present description. In further approaches, the first heating device 612 may include leads (not shown) of conventional construction, and in a preferred embodiment, the main material of the first heating device thickened by a layer of Cu and/or Ta to reduce resistance of the leads.

With continued reference to the embodiment of FIG. 6, in addition to being a heater, the first heating device 612 may also and/or alternatively function as a waveguide power sensor. In preferred approaches, a waveguide power sensor may be able to monitor the optical power of the light, e.g., the laser power, in the waveguide 610, e.g., during write operations. Moreover, the detected optical power may be utilized in combination with control of the first heating device 612 to maintain an about constant spacing between a media facing side of the apparatus 600 at about the main pole 606 of the write yoke 602, and the magnetic medium 616, as will be described in further detail below.

Therefore in some embodiments, it may be desirable that the first heating device 612 be positioned relatively close to the waveguide 610. In such embodiments, the gap Δ between the first heating device 612 and the waveguide 610 may determine an amount of optical power (from the waveguide 610) absorbed by the first heating device 612. Therefore, depending on different sensing signal requirements corresponding to certain embodiments, the size of the gap Δ may be different.

Figure 10:
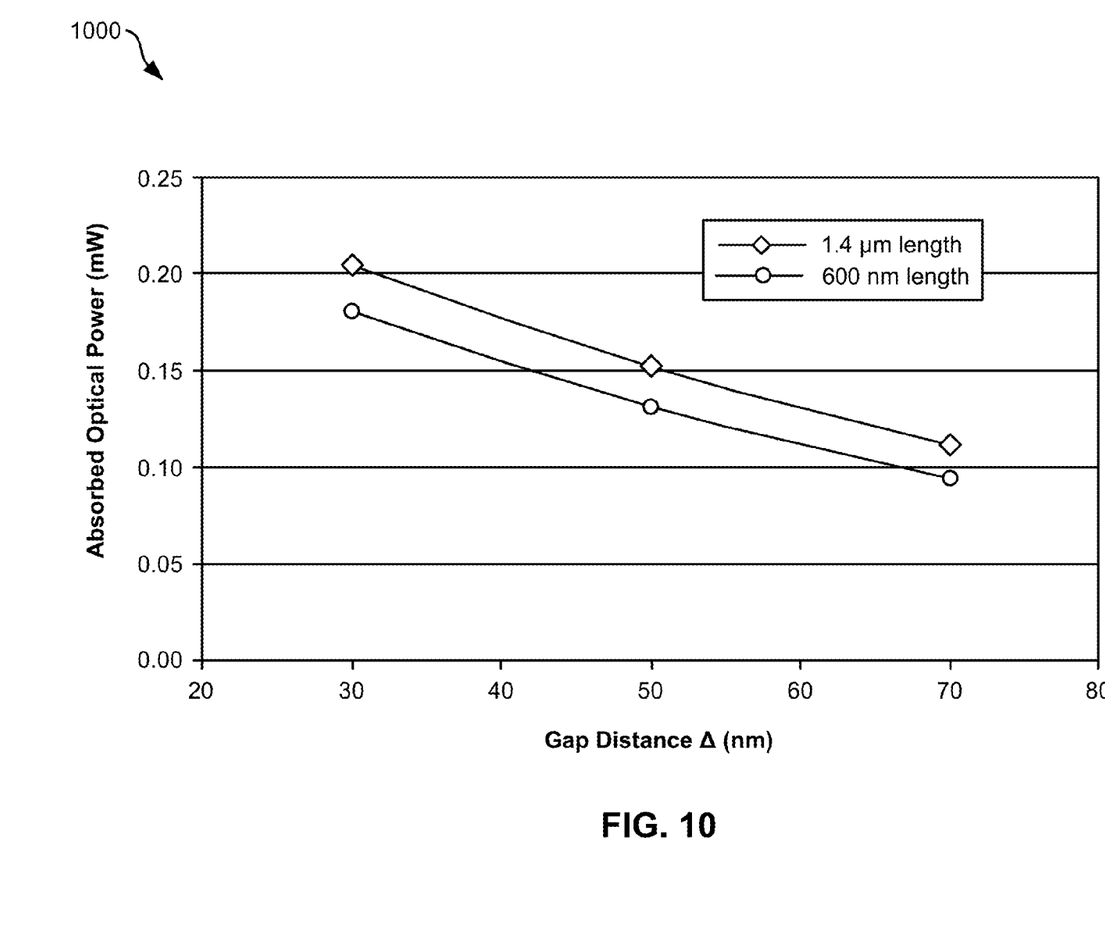
FIG. 10 is a graph of absorbed optical power vs. gap distance, in accordance with two embodiments.

Looking to FIG. 10, the graph 1000 illustrates the effects that different sizes of a gap Δ have on the amount of optical power absorbed by the first heating device 612. The data presented in graph 1000 was gathered from modeling with first heating devices having two different lengths. As illustrated, larger gaps separating the first heating device and the waveguide result in lower amounts of optical power absorbed. Thus, as mentioned above, the size of the gap Δ may be determined based on different sensing signal requirements corresponding to certain embodiments.

The modeling in graph 1000 also shows that the amount of optical power absorbed by the first heating device may additionally be affected by the device's dimensions. Looking to FIG. 10, the device having a 1.4 μm length absorbed about 0.05 mW more optical power than the device having a length of 600 nm. Thus, depending on the desired embodiment, the dimensions of the first heating device may be determined based on different sensing signal requirements corresponding to certain embodiments.

Thus, referring again to FIG. 6, in various approaches the first heating device 612 may have a width (into the page) from about 600 nm to about 2000 nm, but could be higher or lower. Moreover, the first heating device 612 may have a thickness t from about 20 nm to about 100 nm, but could be higher or lower depending on the desired embodiment. Furthermore, the first heating device 612 may have a height h from about 60 nm to about 400 nm, but could be higher or lower. In some embodiments, the first heating device 612 may be considered and/or referred to as a "micro-heater" because of its dimensions, but is in no way limited thereto.

In some embodiments, the optical power in the waveguide 610 may be determined, at least in part, by measuring a change in the resistance of the first heating device 612 from an at rest value, e.g., when the waveguide is not transferring any light therein. According to various approaches, the first heating device 612 may have an at rest resistance from about 60 ohms (Ω) to about 160Ω, more preferably from 50Ω to about 150Ω about but could be higher or lower depending on the desired embodiment.

According to an example, which is in no way intended to limit the invention, the first heating device 612 may have an at rest resistance of 100Ω while the waveguide 610 is inactive (not transferring any light therein). However, as the waveguide begins to transfer light to the NFT, e.g., during a write operation, the first heating device 612 begins to absorb optical power from the waveguide 610. Moreover, by absorbing the optical power from the waveguide 610, the temperature of the first heating device 612 increases, thereby causing the effective resistance of the first heating device 612 to increase as well. Thus, by calculating the change in the resistance of the first heating device 612 from an at rest value of 100Ω, the optical power in the waveguide 610 may be determined.

In an exemplary embodiment, which is in no way intended to limit the invention, the temperature of the first heating device 612 may increase about 302.2 Kelvin as a result of absorbing about 5% of the optical power from the waveguide 610. Moreover, a rise in temperature of about 302.2 Kelvin may result in an increase in resistance of about 7.82Ω, but could be higher or lower depending on the desired embodiment.

According to one approach, the resistance of the first heating device 612 may be measured by applying a nominal biasing voltage to the heating device 612 and measuring the current passing therethrough. The biasing voltage and measured current may then be used to calculate the corresponding resistance of the heating device 612, e.g., using the equation voltage(V)/current(I)=resistance(R). However, in other embodiments, any other method of measuring the resistance of the heating device 612 that would be apparent to one skilled in the art upon reading the present description may be implemented.

The biasing voltage and/or current may be less than a "heating" voltage and/or current applied to the first heating device 612 when inducing thermal protrusion. Preferably, the biasing voltage and/or current are low enough not to cause any significant thermal expansion of the write pole closest thereto, e.g., less than one quarter, preferably less than one tenth of the steady state protrusion that would be induced by the first heating device 612 if operated continuously at the heating voltage and/or current.

Upon determining the optical power in the waveguide 610, it may be used to activate and/or deactivate the first heating device 612 as will soon become apparent.

Figure 7:
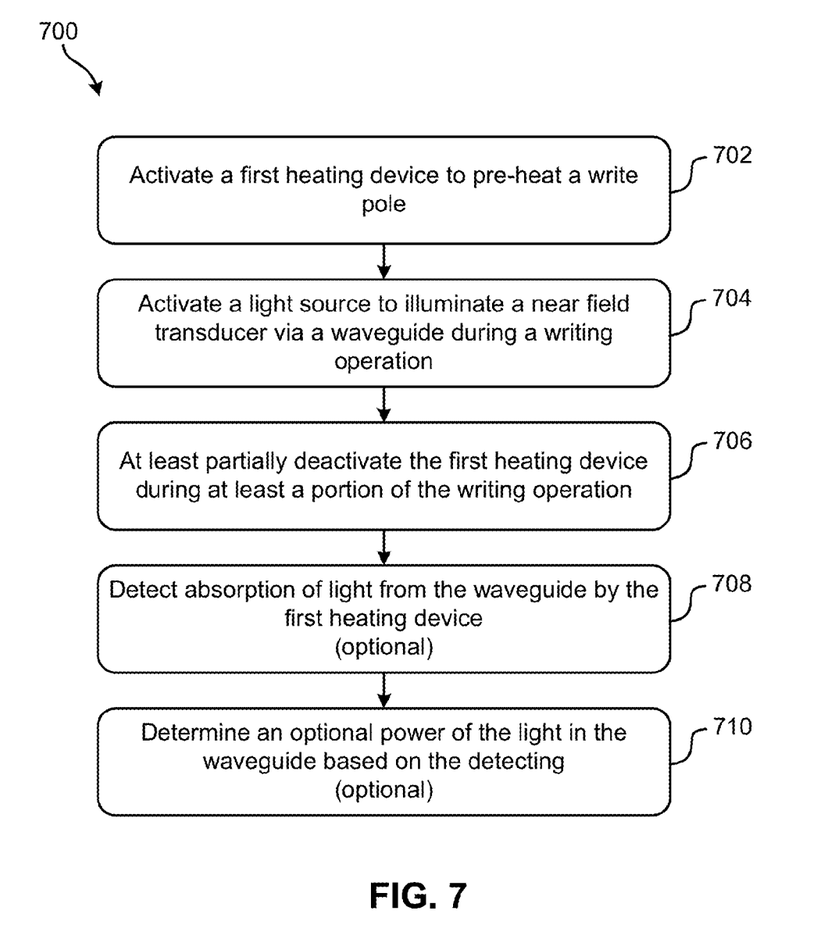
FIG. 7 is a flowchart of a method, in accordance with one embodiment.

FIG. 7 depicts a flowchart according to a method 700 for pre-protruding a write pole, in accordance with one embodiment. As an option, the present method 700 may be implemented in conjunction with features from any other embodiment listed herein, such as those described with reference to the other FIGS., such as the disk drive 100 of FIG. 1. Specifically, the control unit 129 of FIG. 1 may be used to perform one or more steps of method 700.

Of course, however, such method 700 and others presented herein may be used in various applications and/or in permutations which may or may not be specifically described in the illustrative embodiments listed herein. Further, the method 700 presented herein may be used in any desired environment. Thus FIG. 7 (and the other FIGS.) should be deemed to include any and all possible permutations.

Looking now to FIG. 7, method 700 includes activating a first heating device to pre-heat a write pole. See operation 702. By pre-heating the write pole, the materials of a media facing side of a magnetic head are heated and expand as a result. Thus, by heating a write pole prior to performing a write operation, pre-protrusion may be achieved at a media facing side of a magnetic head. As will be described in further detail below, pre-protrusion may be used to achieve about constant head-media spacing for a given period of time.

Moreover, operation 704 includes activating a light source to illuminate an NFT via a waveguide during a writing operation (e.g., a HAMR writing operation). Method 700 further includes at least partially deactivating the first heating device during at least a portion of the writing operation. See operation 706. According to one approach, activating the light source and deactivating the first heating device may occur about simultaneously, e.g., within about 10 microseconds. However, in other approaches, the light source and/or the first heating device may be activating or deactivated at different times. For example, a controller (e.g., see control unit 129 of FIG. 1) may be used to determine a timing offset between activating the light source and deactivating the first heating device.

Implementing a timing offset between activating the light source and deactivating the first heating device may ensure an about constant head-media spacing in various embodiments. For example, the heating device may deactivate more quickly than the light source is able to activate and/or induce significant thermal protrusion via the NFT. Thus in the present example, the first heating device may be deactivated a given amount of time after the light source has been activated.

As previously mentioned, the first heating device may work in combination with the waveguide and NFT to achieve an about constant spacing between a media facing side of an apparatus at about the write pole and a medium. Specifically, activating the light source and at least partially deactivating the first heating device may be coordinated to achieve an about constant head-media spacing. According to a preferred approach, the about constant spacing may occur as a result of pre-protruding the media facing side of the apparatus (e.g., see 600 of FIG. 6) prior to performing a write operation, as will soon become apparent.

Figure 8:
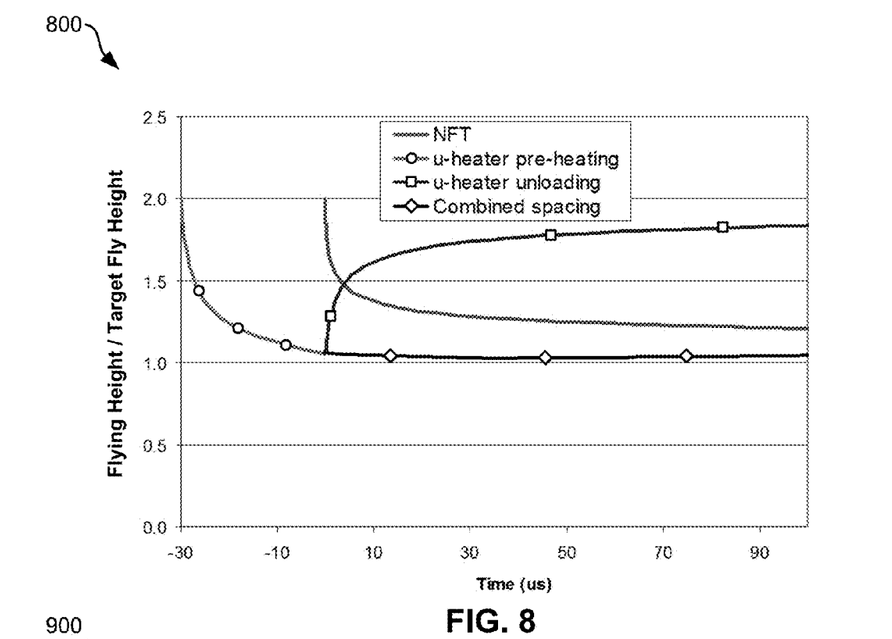
FIG. 8 is a graph of a fly height ratio vs. time, in accordance with one embodiment.

Looking to FIG. 8, graph 800 illustrates the results of modeling an exemplary embodiment for achieving a desirable pre-protrusion. Although graph 800 generally follows the method steps illustrated in FIG. 7 as described immediately above, the embodiment illustrated in FIG. 8 is in no way intended to limit the scope of method 700.

Referring now to FIG. 8, the first heating device is activated about 30 μs before a write operation is initiated at the time 0 μs. This results in a reduction of the head-media spacing from about two times a target spacing to about the target spacing at time 0 μs. See the line labeled "U-heater pre-heating."

At time 0 μs, a light source is activated (e.g., to illuminate an NFT heater) while the first heating device is deactivated about simultaneously. Despite the first heating device being deactivated, the head-media spacing remains at about the desired target spacing, preferably for the remainder of the write operation. See the line labeled "Combined spacing."

Comparatively, the line labeled NFT depicts the head-media spacing that would occur without operating the first heating device. As shown, even at 100 μs, the head-media spacing is still shrinking towards the 1 nm steady state spacing.

Although the embodiment illustrated in the graph 800 of FIG. 8 shows the first heating device being completely deactivated once the NFT is activated, in other approaches the first heating device may be deactivated during only a portion or portions of the writing operation. However, in still other approaches, the first heating device may be active during the entire writing operation, perhaps at a lower setting that works in concert with the NFT-induced protrusion to achieve a desired head-media spacing. It should be noted that in various embodiments, the activity of the first heating device may be determined by the physical characteristics thereof, the efficiency of the waveguide, the type of magnetic medium, the desired spacing between a media facing side of an apparatus at about the write pole and a medium, etc., depending on the desired embodiment.

Finally, the line labeled "u-heater unloading" in FIG. 8 depicts the effect of receding protrusion when the first heating device is deactivated, and the NFT is not activated.

Thus, as shown in FIG. 8, the preheating followed by illumination of the NFT quickly achieves and maintains an about consistent head-media spacing during the entire write operation.

According to an exemplary embodiment, the activation or deactivation of the first heating device and/or the light source may be determined by the detection of absorption of light, as will soon become apparent.

Thus, referring again to FIG. 7, method 700 additionally includes detecting absorption of light from the waveguide by the first heating device. See optional operation 708. Furthermore, optional operation 710 includes determining an optical power of the light in the waveguide based on the detecting (of optional operation 708).

As described above with reference to the apparatus 600 of FIG. 6, the first heating device may also act as a waveguide power sensor. In preferred approaches, a waveguide power sensor may be able to monitor the optical power in a waveguide, e.g., during write operations. According to one embodiment, the absorption of light from the waveguide may be detected by passing a current through the first heating device and detecting thermally-induced resistance changes therein. For example, as the waveguide begins to transfer light to the NFT, e.g., during a write operation, the first heating device begins to absorb optical power from the waveguide and increase in temperature. As a result, the effective resistance of the first heating device increases as well. Thus, passing a current through the first heating device may be used to determine the optical power in the waveguide.

Figure 9:
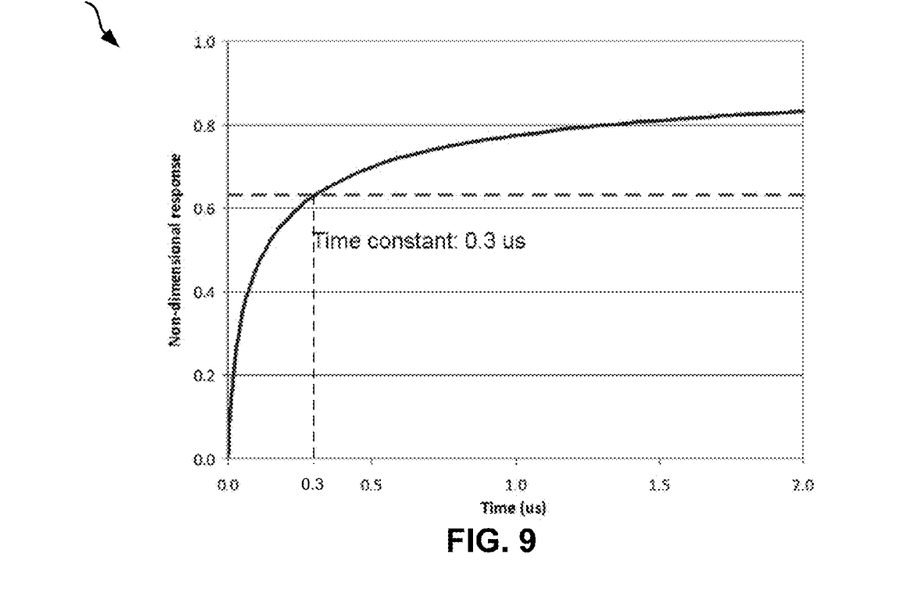
FIG. 9 is a graph of non-dimensional response vs. time, in accordance with one embodiment.

In different embodiments, maintaining an about constant head-media spacing may vary from merely detecting that light is in the waveguide, to more complex algorithms which include determining an amount of optical power in the waveguide at a given time. In a preferred approach, a waveguide power sensor may have a temperature response time constant from about 0.1 μs to about 0.5 μs, but could be higher or lower depending on the desired embodiment. Looking momentarily to FIG. 9, graph 900 includes the response characteristics of an exemplary waveguide power sensor having a temperature response time constant of about 0.3 µs.

Moreover, the optical power in the waveguide may be utilized in combination with the first heating device to maintain an about constant head-media spacing. Therefore, according to different approaches, the first heating device may be partially or fully deactivated based on the determined optical power.

In one example, which is in no way intended to limit the invention, both the first heating device and the light source may be interchangeably activated and/or deactivated at times along the duration of a write operation, e.g., to compensate for fluctuating write time conditions. This preferably ensures an about constant head-media spacing, despite potentially harmful changes in run-time ambient temperature, vibrations and/or motion originating from outside the system (e.g., apparatus 600), media signal strength, etc.

As described above with reference to the apparatus 600 of FIG. 6, the first heating device may also act as a waveguide power sensor. In preferred approaches, a waveguide power sensor may be able to monitor the optical power in the waveguide, e.g., during write operations.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a write pole;
   a near field transducer;
   a waveguide for delivering light to the near field transducer;
   a first heating device positioned between the write pole and at least one of the waveguide and the near field transducer; and
   electrical leads extending from the first heating device for passing a current through the first heading device.

2. The apparatus as recited in claim 1, wherein the write pole is a main pole.

3. The apparatus as recited in claim 1, wherein the write pole is a return pole.

4. The apparatus as recited in claim 1, wherein the first heating device is also a power sensor.

5. The apparatus as recited in claim 4, wherein the first heating device has a resistance of 50 to 150 ohms.

6. The apparatus as recited in claim 4, wherein a gap between the first heating device and the waveguide determines an amount of optical power absorbed by the first heating device.

7. The apparatus as recited in claim 1, wherein the apparatus further includes a thermal fly-height control heater.

8. A magnetic data storage system, comprising:
   at least one apparatus as recited in claim 1;
   a magnetic medium;
   a drive mechanism for passing the magnetic medium over the at least one apparatus; and
   a controller electrically coupled to the at least one apparatus for controlling operation of the at least one apparatus.

9. The magnetic data storage system as recited in claim 8, wherein the controller is configured to:
   activate a first heating device to pre-heat a write pole;
   activate a light source to illuminate a near field transducer via a waveguide during a writing operation; and
   at least partially deactivate the first heating device during at least a portion of the writing operation.

10. The magnetic data storage system as recited in claim 9, wherein the controller is configured to activate the light source and deactivate the first heating device about simultaneously.

11. The magnetic data storage system as recited in claim 9, wherein the controller is configured to activate the light source and at least partially deactivate the first heating device in a coordinated manner to achieve an about constant spacing between a media facing side of the apparatus at about the write pole and a medium.

12. The magnetic data storage system as recited in claim 9, wherein the first heating device has a resistance of 50 to 150 ohms.

13. The magnetic data storage system as recited in claim 9, wherein the controller is further configured to:
   detect absorption of light from the waveguide by the first heating device; and
   determine an optical power of the light in the waveguide based on the detected absorption.

14. The magnetic data storage system as recited in claim 9, wherein the first heating device is partially or fully deactivated based on the determined optical power.

15. A method for pre-protruding a write pole, the method comprising:
   activating a first heating device to pre-heat a write pole;
   activating a light source to illuminate a near field transducer via a waveguide during a writing operation; and
   at least partially deactivating the first heating device during at least a portion of the writing operation.

16. The method as recited in claim 15, wherein activating the light source and deactivating the first heating device occur about simultaneously.

17. The method as recited in claim 15, wherein the activating the light source and at least partially deactivating the first heating device are coordinated to achieve an about constant spacing between a media facing side of the write pole and a medium.

18. The method as recited in claim 15, wherein the first heating device has a resistance of 50 to 150 ohms.

19. The method as recited in claim 15, wherein the method further includes:
   detecting absorption of light from the waveguide by the first heating device; and
   determining an optical power of the light in the waveguide based on the detecting.

20. The method as recited in claim 19, wherein the first heating device is partially or fully deactivated based on the determined optical power.

* * * * *

UNITED STATES PATENT AND TRADEMARK OFFICE
CERTIFICATE OF CORRECTION

PATENT NO. : 9,087,546 B1
APPLICATION NO. : 14/271254
DATED : July 21, 2015
INVENTOR(S) : Michael K. Grobis et al.

Page 1 of 1

It is certified that error appears in the above-identified patent and that said Letters Patent is hereby corrected as shown below:

In the specification:

Col. 5, line 24 replace "process, may" with --process, which may--.

Signed and Sealed this
Twenty-second Day of March, 2016

Michelle K. Lee
*Director of the United States Patent and Trademark Office*